United States Patent
Kim et al.

(10) Patent No.: US 9,241,035 B2
(45) Date of Patent: Jan. 19, 2016

(54) ORGANIZATION OF INPUTS FOR ONLINE SERVICE

(75) Inventors: Seungil Kim, Seoul (KR); Youngil Ko, Seoul (KR)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/701,359

(22) PCT Filed: Jul. 6, 2012

(86) PCT No.: PCT/US2012/045678
§ 371 (c)(1),
(2), (4) Date: Nov. 30, 2012

(87) PCT Pub. No.: WO2014/007826
PCT Pub. Date: Jan. 9, 2014

(65) Prior Publication Data
US 2014/0012914 A1    Jan. 9, 2014

(51) Int. Cl.
 G06F 15/16    (2006.01)
 H04L 29/08    (2006.01)
(52) U.S. Cl.
 CPC ..................................... H04L 67/22 (2013.01)
(58) Field of Classification Search
 USPC .................... 709/201–206, 217, 232
 See application file for complete search history.

(56) References Cited

U.S. PATENT DOCUMENTS

| | | | | |
|---|---|---|---|---|
| 6,029,195 | A * | 2/2000 | Herz | 725/116 |
| 6,356,899 | B1 | 3/2002 | Chakrabarti et al. | |
| 7,069,003 | B2 * | 6/2006 | Lehikoinen et al. | 455/414.2 |
| 7,383,497 | B2 * | 6/2008 | Glenner et al. | 715/231 |
| 7,797,270 | B2 * | 9/2010 | Kester et al. | 717/168 |
| 8,311,792 | B1 * | 11/2012 | Podgorny et al. | 703/13 |
| 8,527,869 | B2 * | 9/2013 | Hosea et al. | 715/234 |
| 2005/0138552 | A1 * | 6/2005 | Venolia | 715/526 |
| 2005/0198195 | A1 * | 9/2005 | Bowser et al. | 709/217 |
| 2006/0235933 | A1 * | 10/2006 | Baluja et al. | 709/207 |
| 2007/0061297 | A1 * | 3/2007 | Bihun et al. | 707/3 |
| 2007/0271502 | A1 * | 11/2007 | Bedi et al. | 715/512 |
| 2008/0091834 | A1 * | 4/2008 | Norton | 709/229 |
| 2009/0070852 | A1 | 3/2009 | Chijilwa et al. | |
| 2010/0093316 | A1 | 4/2010 | Doppler et al. | |
| 2010/0269158 | A1 * | 10/2010 | Ehler et al. | 726/4 |
| 2011/0231296 | A1 | 9/2011 | Gross et al. | |
| 2011/0258559 | A1 * | 10/2011 | You et al. | 715/752 |
| 2011/0288912 | A1 * | 11/2011 | McCrea et al. | 705/14.2 |
| 2012/0047529 | A1 | 2/2012 | Schultz et al. | |
| 2013/0159123 | A1 * | 6/2013 | Hochberg et al. | 705/26.1 |
| 2014/0046751 | A1 * | 2/2014 | Akbar et al. | 705/14.39 |

OTHER PUBLICATIONS

Java, Akshay, et al. "Feeds That Matter: A Study of Bloglines Subscriptions." ICWSM. 2007.*
International Search Report and Written Opinion from International Application No. PCT/US12/45678 mailed Sep. 24, 2012.

* cited by examiner

*Primary Examiner* — Liangche A Wang
*Assistant Examiner* — Melaku Habtemariam
(74) *Attorney, Agent, or Firm* — Brundidge & Stanger, P.C.

(57) ABSTRACT

Technologies are generally described for organizing inputs for an online service. It is determined that there are no updated inputs generated on a personalized page hosted on a server corresponding to the online service for a predetermined time period. The inputs may be associated with an acknowledged contact regarding the online service. Inputs previously generated on the personalized page hosted on the server are reorganized in accordance with one of multiple arrangements.

11 Claims, 6 Drawing Sheets

ORGANIZATION OF INPUTS FOR ONLINE SERVICE

CROSS-REFERENCE TO RELATED APPLICATION

This Application is the National Stage filing under 35 U.S.C. §371 of PCT Application Ser. No. PCT/US2012/045678, filed on Jul. 6, 2012.

BACKGROUND

Online services, such as social networks, allow a user to upload personal content and information to a server. The personal content and information may be made available for viewing by other users or the public. Through the online services, users may share their life story and/or thoughts, and at the same time service providers may get benefits from the services such as advertising revenue.

SUMMARY

According to one example, a method for organizing input for an online service is provided. Upon determining that there are no updated inputs generated on a personalized page hosted on a server corresponding to the online service for a predetermined time period, with the inputs being associated with an acknowledged contact regarding the online service, inputs previously generated on the personalized page hosted on the server are reorganized.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

In the detailed description that follows, embodiments are described as illustrations since various changes and modifications will become apparent to those skilled in the art from the following detailed description. The use of the same reference numbers in different figures indicates similar or identical items.

DETAILED DESCRIPTION

Figure 1:
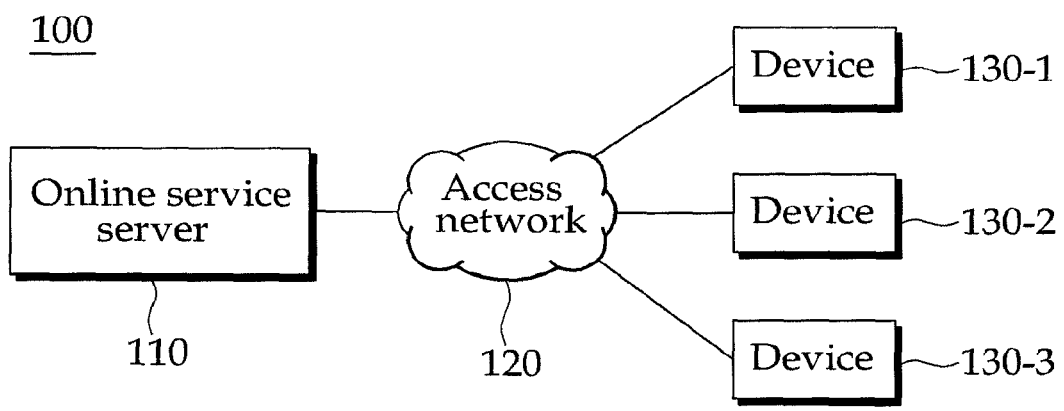
FIG. 1 is a schematic diagram illustrating an example of an environment for executing an online service, arranged in accordance with at least some embodiments described in the present disclosure.

According to one example, a method for organizing inputs for an online service is provided. Upon determining that there are no updated inputs generated on a personalized page hosted on a server corresponding to the online service for a predetermined time period, with the inputs being associated with an acknowledged contact regarding the online service, inputs previously generated on the personalized page hosted on the server are reorganized.

The inputs may include at least one of an image, a video, a voice, a text, a message, a profile change, a status change, an indication of activity, and a rating of a previously uploaded input.

The inputs previously generated on the personalized page hosted on the server may be reorganized by identifying inputs that were generated on the personalized page hosted on the server before the contact was acknowledged, and displaying the identified inputs as the most readily accessible inputs.

The inputs previously generated on the personalized page hosted on the server may be reorganized by identifying inputs that were previously generated on the personalized page hosted on the server but that were not accessed, read or viewed on the personalized page, and displaying the identified inputs as the most readily accessible inputs.

The inputs previously generated on the personalized page hosted on the server may be reorganized by randomly selecting inputs among inputs that were previously generated on the personalized page hosted on the server, and displaying the selected inputs as the most readily accessible inputs.

The predetermined time period may be determined based on a policy of the online service or based on frequency of access of a user corresponding to the personalized page.

The online service may include a social network service, a blog service, a micro-blog service, and a service that may be provided by various types of websites providing a comment section. The acknowledged contact may include a friend, relative, business networking contact, registered user, etc.

In another example, an apparatus for organizing inputs for an online service includes a processor. The processor may determine that there are no updated inputs generated on a personalized page hosted on a server corresponding to the online service for a predetermined time period. The inputs may be associated with an acknowledged contact regarding the online service. The contact may be acknowledged by a friend, relative, business networking contact, registered user, etc., who receives a request for the contact. The processor may further reorganize inputs previously generated on the personalized page hosted on the server.

The processor may reorganize inputs previously generated on the personalized page hosted on the server by identifying inputs that were generated on the personalized page hosted on the server before the contact was acknowledged, and displaying the identified inputs as the most readily accessible inputs.

The processor may reorganize inputs previously generated on the personalized page hosted on the server by identifying inputs that were previously generated on the personalized page hosted on the server but that were not accessed, read or viewed on the personalized page, and displaying the identified inputs as the most readily accessible inputs.

The processor may reorganize inputs previously generated on the personalized page hosted on the server by randomly selecting inputs among inputs that were previously generated on the personalized page hosted on the server, and displaying the selected inputs as the most readily accessible inputs.

In yet another example, a computer-readable medium may store a plurality of computer-executable instructions executed by a processor. The plurality of computer-executable instructions may include one or more computer-executable instructions for allowing the processor to determine that there are no updated inputs generated on a personalized page hosted on a server corresponding to an online service for a predetermined time period. The inputs may be associated with an acknowledged contact regarding the online service. The plurality of computer-executable instructions may include one or more computer-executable instructions for allowing the processor to reorganize inputs previously generated on the personalized page hosted on the server for the online service.

The plurality of computer-executable instructions may further include one or more computer-executable instructions for allowing the processor to identify inputs that were generated on the personalized page hosted on the server before the contact was acknowledged, and one or more computer-executable instructions for allowing the processor to display the identified inputs as the most readily accessible inputs.

The plurality of computer-executable instructions may further include one or more computer-executable instructions for allowing the processor to identify inputs that were previously generated on the personalized page hosed on the server but that were not accessed, read or viewed on the personalized page, and one or more computer-executable instructions for allowing the processor to display the identified inputs as the most readily accessible inputs.

The plurality of computer-executable instructions may further include one or more computer-executable instructions for allowing the processor to randomly select inputs among inputs that were previously generated on the personalized page hosted on the server, and one or more computer-executable instructions for allowing the processor to display the selected inputs as the most readily accessible inputs.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are explicitly contemplated herein.

FIG. 1 is a schematic diagram illustrating an example of an environment for executing an online service, arranged in accordance with at least some embodiments described in the present disclosure. Referring to FIG. 1, in an environment 100 for executing an online service, an online service server 110 provides its service to one or more users via an access network 120. The one or more users may receive the online service using one or more devices 130-1, 130-2 or 130-3. Though illustrated with only three devices 130-1, 130-2 and 130-3 in FIG. 1, one of skill in the art may readily understand more devices may access online service server 110 via access network 120. Devices 130-1, 130-2 and 130-3 may include, but are not limited to, a desktop computer, laptop or tablet computer, a mobile communication device, a personal digital assistant, a television, smart equipment, etc. One or more of devices 130-1, 130-2 or 130-3 may access online service server 110 via access network 120 such as the Internet. In one example, the online service may include, but is not limited to, a social network service, a blog service, a micro-blog service, and a service that may be provided by various types of websites providing a comment section. The social network service is broadly described as any service that allows a user of the service to share personal information or content with other users of the service, including users who are acknowledged and therefore provided access to more of the personal information or content than the access provided to users who are not acknowledged.

The user may create an account for the online service. Online service server 110 for the online service may provide the user with a personalized page regarding the online service. The user may generate and upload inputs on the personalized page hosted on online service server 110 using device 130-1, 130-2 or 130-3.

Online service server 110 may also generate inputs on the personalized page corresponding to the user. For example, the inputs generated by online service server 110 may include an indication of a status or an activity such as "today is Mark's birthday" or "Mark obtained 2 million dollars in the game." The personalized page corresponding to the user may also present inputs uploaded by other users by linking the inputs uploaded on other users' personalized pages.

The user may view inputs that the other users uploaded via device 130-1, 130-2 or 130-3 or inputs generated by online service server 110. The user may have a particular relationship with another user by sending a request for a contact to the other user and receiving an acknowledgement from the other user. If the request for the contact is accepted by the other user (i.e., the user receives the acknowledgement from the other user), the user sending the request and the user accepting the request become acknowledged contacts. A user may upload one or more inputs to the personalized page hosted on online service server 110 using device 130-1, 130-2 or 130-3.

The personalized page may present the uploaded or generated inputs in various arrangements such that the most recently uploaded or generated inputs are most readily accessible by the user. By way of example, the inputs may be presented in reverse chronological order or appear at the top of the personalized page. The inputs may be visible to the public, to the acknowledged contacts, or to oneself who uploaded the inputs in accordance with a user defined policy.

The inputs may include at least one of an image, a video, a voice, a text, a message, a profile change, a status change, an indication of activity and adding a rating. The inputs such as an image, a video, a voice, a text and a message may be generated and uploaded by users. The inputs such as a profile change, a status change and an indication of activity may be generated by online service server 110. In one example, the request for the contact may include a request for acknowledgement regarding the online service and the acknowledged contact may include a friend, relative, business networking contact, registered user, etc., regarding the online service.

Figure 2:
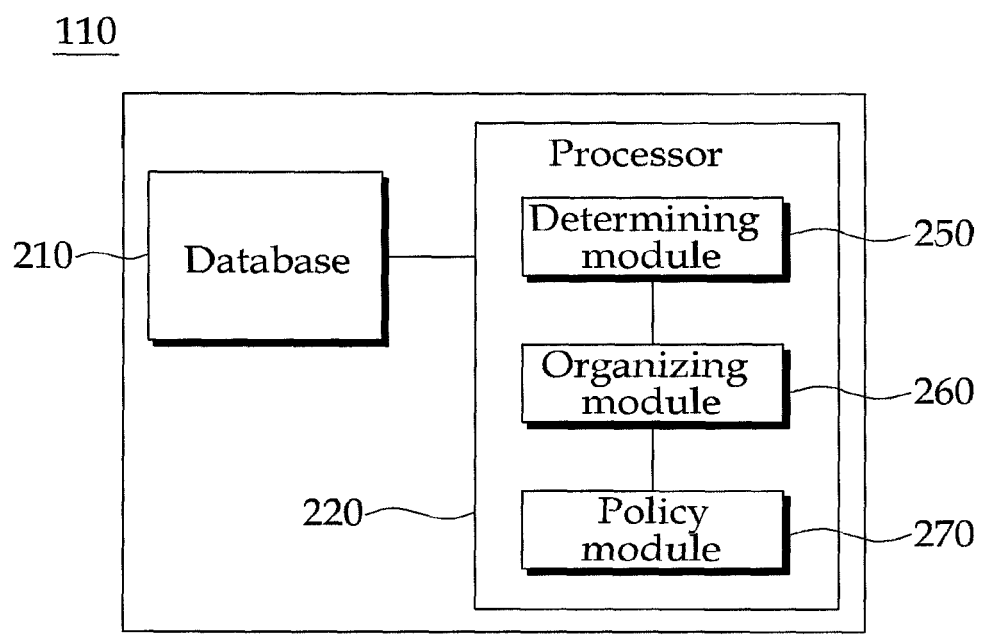
FIG. 2 is a schematic diagram illustrating an example of an online service server, arranged in accordance with at least some embodiments described in the present disclosure.

FIG. 2 is a schematic diagram illustrating an example of online service server 110 shown in FIG. 1, arranged in accordance with at least some embodiments described in the present disclosure. Referring to FIG. 2, online service server 110 may include a database 210 and a processor 220. Database 210 may be any type of electronic collection of data, which is known in the art. In one example, database 210 may store user information such as profile information for each user regarding the online service managed by online service server 110.

The profile information may include, but is not limited to, a unique user identifier (user ID), name, age, gender, location, hometown, references to image files, listing of interests, attributes, and the like. In one example, database 210 may store information about a relationship between users. By way of example, database 210 may contain a list of acknowledged contacts for each user. Database 210 may store one or more inputs that are uploaded by users so that the inputs are made available to other users. Database 210 may store any other information that may be used to manage the online service. Even though database 210 is depicted as being one element in FIG. 2, database 210 may be configured to include sub-databases for storing the user information, the relationship information, the uploaded inputs, any other information, and/or combinations thereof.

As shown in FIG. 2, processor 220 may include a determining module 250, an organizing module 260 and a policy module 270.

In one example, determining module 250 may be configured to determine if there are updated inputs, which are associated with acknowledged contacts (i.e., the inputs which are uploaded by the acknowledged contacts or the inputs corresponding to the acknowledged contacts which are generated by online service server 110), generated on the personalized page hosted on online service server 110 for a predetermined time period.

In response to the determination that there are any updated inputs associated with the acknowledged contacts generated on online service server 110, organizing module 260 organizes the updated inputs to be published and displayed on the personalized page hosted on online service server 110 as the most readily accessible inputs. By way of example, the updated inputs may be displayed at the top of the personalized page such that acknowledged contacts may readily view the updated inputs.

In response to the determination that there are no updated inputs associated with the acknowledged contacts generated on the personalized page hosted on online service server 110 for a predetermined time period, organizing module 260 reorganizes the inputs previously generated on the personalized page hosted on online service server 110 in accordance with one of multiple arrangements.

In one example, organizing module 260 may identify inputs that were generated on the personalized page hosted on online service server 110 before the contact was acknowledged, i.e., before the friend request was acknowledged. Then, organizing module 260 displays the identified inputs as the most readily accessible inputs, i.e., displays the identified inputs at the top of the personalized page hosted on online service server 110. The inputs generated before the contact was acknowledged are the ones which were mostly not read or viewed. Accordingly, when a user accesses online service server 110 and recognizes that there are no updated inputs, the user will not disconnect the access to online service server 110 but maintain the access to online service server 110 to identify and read, view, or even listen to such identified inputs.

In another example, organizing module 260 may identify inputs that were previously generated on the personalized page hosted on online service server 110 but that were not accessed, read or viewed by a user corresponding to the personalized page. Organizing module 260 displays the identified inputs as the most readily accessible inputs. When a user accesses online service server 110, the user may skip some inputs associated with the acknowledged contacts. Organizing module 260 may identify such skipped inputs and collect them to display, for example, at the top of the personalized page hosted on online service server 110. The skipped inputs may be collected when the inputs are skipped by a user, or when the inputs are reorganized by organizing module 260. Such identification of the inputs that are skipped may be executed by incorporating an aggregator function into organizing module 260. The aggregator may include, but be not limited thereto, a rich site summary (RSS) reader which is known in the art.

In another example, organizing module 260 may randomly select inputs among inputs that were previously generated on the personalized page hosted on online service server 110. The inputs may be selected among the inputs stored in database 210. Organizing module 260 displays the selected inputs as the most readily accessible inputs. The selected inputs may be arranged on the personalized page by time, by acknowledged contact, or by a predetermined arrangement which is defined by a user.

As described above, organizing module 260 may reorganize the inputs previously generated on online service server 110 and display the reorganized inputs as the most readily accessible inputs so that a user will maintain the access to online service server 110 to identify and enjoy such inputs. This will make the user maintain the access to online service server 110 for longer time.

As shown in FIG. 2, policy module 270 may create, process and/or contain policies defined by users with regard to the online service. By way of example, the policies may include information regarding how the inputs identified by organizing module 260 should be arranged on the personalized page for each user. The policies may include information on to whose user's inputs are permitted to be published. The policies may include one or more user-defined time periods. For example, the predetermined time period that is a basis of determining if there are updated inputs may be included in the user-defined time periods.

Determining module 250 may be further configured to determine a frequency of access for each user. The frequency of access for each user may be determined based on information on how frequently each user accesses online service server 110. The information may be stored in database 210. The frequency of access may be a basis for determining a predetermined time period which is used in determining if there are no updated inputs generated on online service server 110. For example, determining module 250 may receive information regarding how frequently each user accesses online service server 110 from database 210 and set the predetermined time period based on the information from database 210. By way of example, if a user tends to access online service server 110 every one (1) hour, the predetermined time period may be set by determining module 250 to be one (1) hour, or the predetermined time period may be slightly less or more to one (1) hour. In another example, the frequency of access may be determined by a separate module.

Figure 3:
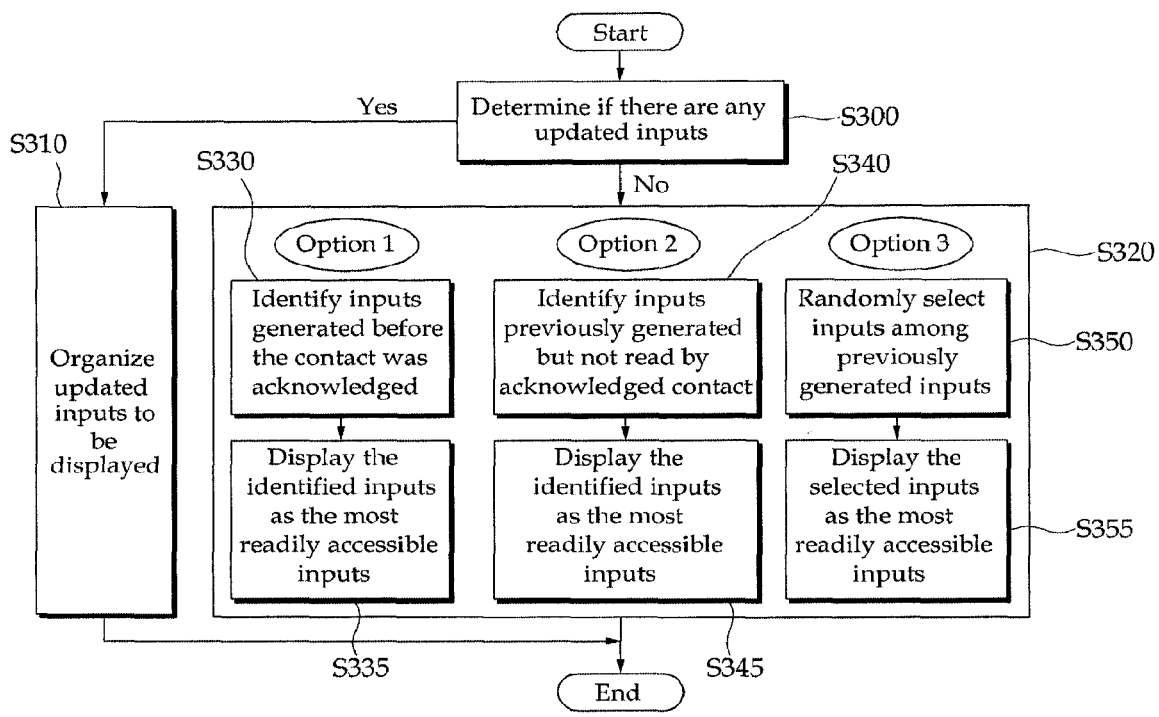
FIG. 3 is a flowchart illustrating an example of a method for organizing inputs for an online service, arranged in accordance with at least some embodiments described in the present disclosure.

FIG. 3 is a flowchart illustrating an example method for organizing inputs for the online service, arranged in accordance with at least some embodiments described in the present disclosure.

Referring to FIG. 3, it is determined if there are any updated inputs generated on a personalized page hosted on online service server 110 within a predetermined time period (S300). The inputs are associated with an acknowledged contact regarding the online service. (S300) may be executed by determining module 250 of processor 220 as shown in FIG. 2. (S300) may be followed by either of (S310) or (S320).

At (S310), in response to the determination that there are updated inputs associated with the acknowledged contacts generated on online service server 110 (i.e., if YES at (S300)), the updated inputs are organized to be published and displayed on the personalized page hosted on online service server 110 as the most readily accessible inputs (S310). (S310) may be executed by organizing module 260 of processor 220, as shown in FIG. 2.

At (S320), in response to the determination that there are no updated inputs associated with the acknowledged contacts generated on online service server 110 for a predetermined time period (i.e., if NO at (S300)), the inputs previously generated on the personalized page hosted on the online service server 110 may be reorganized in accordance with one of multiple arrangements (S320). (S320) may be executed by organizing module 260 of processor 220 as shown in FIG. 2.

(S320) may be executed in accordance with at least one of the reorganizing methods explained below, beginning with any one of (S330), (S340), or (S350).

For a first option, at (S330), the inputs previously generated on online service server 110 may be reorganized by identifying inputs that were generated on the personalized page hosted on online service server 110 before the contact was acknowledged. (S330) may be followed by (S335) at which the identified inputs may be displayed as the most readily accessible inputs.

For a second option, at (S340), the inputs previously generated on online service server 110 may be reorganized by identifying inputs that were previously generated on the personalized page hosted on online service server 110 but that were not accessed or read by a user corresponding to the personalized page. (S340) may be followed by (S345) at which the identified inputs may be displayed as the most readily accessible inputs (S345).

For a third option, at (S350), the inputs previously generated on online service server 110 may be reorganized by randomly selecting inputs among inputs that were previously generated on the personalized page hosted on online service server. (S350) may be followed by (S355) at which the selected inputs may be displayed as the most readily accessible inputs (S355).

In the above three options, the identified inputs or the selected inputs may be displayed at the top of the personalized page so that a user may readily identify such inputs.

Figure 4A:
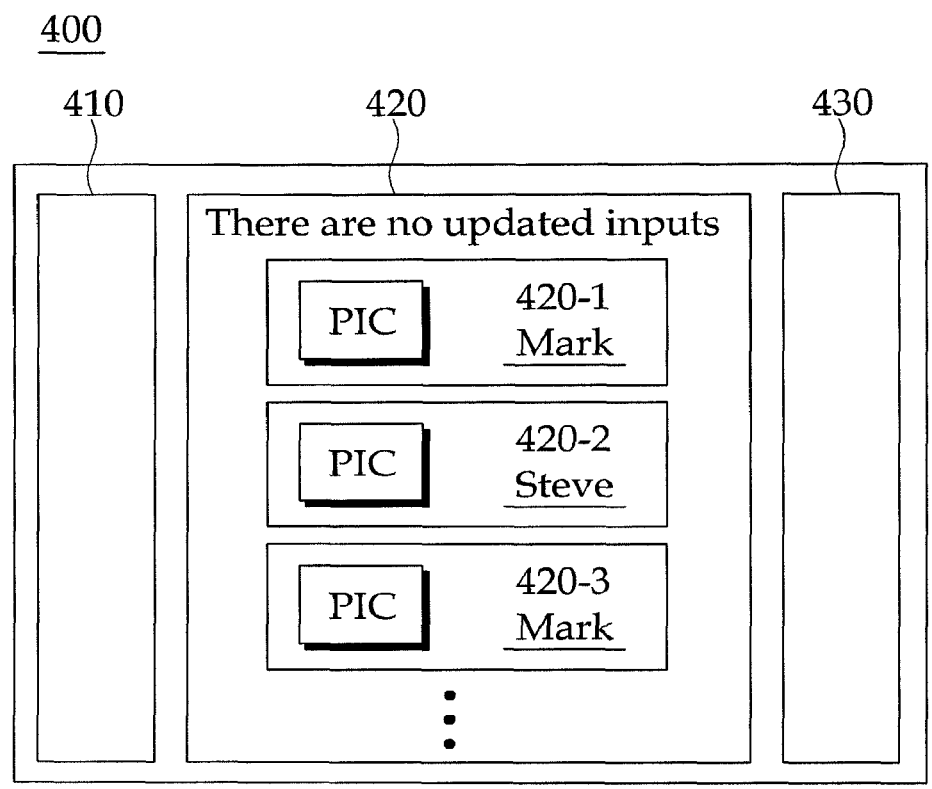
FIGS. 4A and 4B are schematic diagrams illustrating examples of an interface associated with the online service, arranged in accordance with at least some embodiments described in the present disclosure.
Figure 4B:
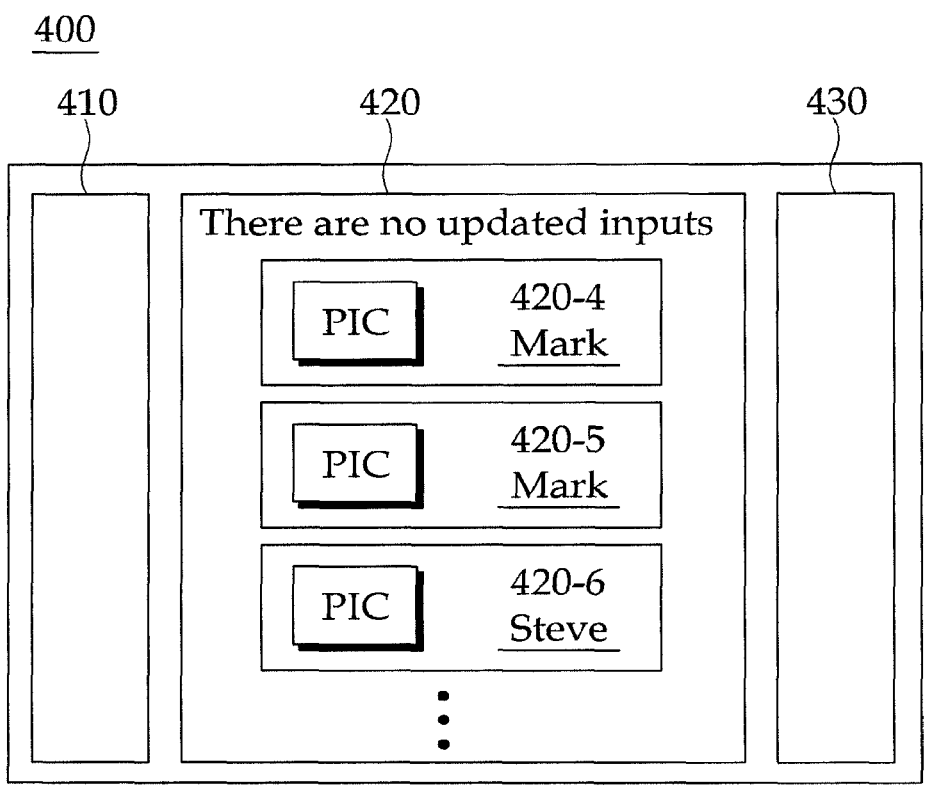

FIGS. 4A and 4B are schematic diagrams illustrating examples of an interface associated with the online service, arranged in accordance with at least some embodiments described in the present disclosure.

FIG. 4A shows an interface 400 which may be a personalized page hosted on online service server 110. Interface 400 may be displayed on a display of device 130-1, 130-2 or 130-3 such as a desktop computer, laptop or tablet computer, a mobile communication device, a personal digital assistant, a television, smart equipment. Interface 400 may include a profile section 410 that includes descriptive information for each user. Profile section 410 may be personalized to each user. Profile section 410 may show a corresponding user's name, picture, listing of interests, groups to which the user belongs, a listing of acknowledged contacts, and the like.

Interface 400 may include a main section 420 on which inputs generated by the user, acknowledged contacts of the user or online service server 110 are displayed. Main section 420 may include one or more sub-sections 420-1, 420-2 and 420-3 on which are displayed an input associated with the user or one of the acknowledged contacts. Each sub-section 420-1, 420-2 and 420-3 may include a main picture (for example, a profile picture) of the user or an acknowledged contact who uploaded an input. Sub-sections 420-1, 420-2 and 420-3 may be arranged in various manners such that the sub-section with the most recently generated input is most readily accessible by the user. For example, sub-sections 420-1, 420-2 and 420-3 may be arranged in reverse chronological order so that sub-section having the most recently generated input appears at the top of main section 420. By way of example, sub-section 420-1 may display an input generated more recently than an input displayed in sub-section 420-2.

If there are no updated inputs associated with the acknowledged contacts generated on online service server 110 for a predetermined time period, main section 420 may display the previously generated inputs that are reorganized in accordance with one of multiple arrangements. In other words, the inputs may be the inputs that are reorganized in accordance with the options described with reference to FIG. 3.

For example, main section 420 may display the inputs that were generated on the personalized page hosted on online service server 110 before the contact was acknowledged. The inputs may correspond to one or more acknowledged contacts and be displayed in various arrangements. For example, the inputs may be arranged in reverse chronological order. By way of example, FIG. 4A shows sub-section 420-1 having a first acknowledged contact's (for example, Mark's) input that was uploaded on online service server 110 before the contact was acknowledged. The next sub-section 420-2 may include a second acknowledged contact's (for example, Steve's) input that was uploaded on online service server 110 before the contact was acknowledged and was uploaded before the Mark's input displayed in sub-section 420-1 was uploaded. Sub-section 420-3 may include the first acknowledged contact's input again in accordance with the reverse chronological order. Each sub-section 420-1, 420-2 and 420-3 may include a time reference when the input associated with each sub-section 420-1, 420-2 and 420-3 uploaded. Main section 420 may include an indication that there are no updated inputs so that a user may recognize the displayed inputs are the reorganized inputs which are previously generated on online service server 110.

FIG. 4B shows another example of arrangements of the reorganized inputs in main section 420. For example, the reorganized inputs may be displayed for each acknowledged contact. By way of example, Mark's inputs that are identified as inputs uploaded before the contact was acknowledged are arranged first, i.e., at the top of main section 420 (for example, in sub-section 420-4 and 420-5) and then Steve's inputs that are identified as inputs uploaded before the contact was acknowledged are arranged after Mark's inputs (for example, in sub-section 420-6).

For option 2 explained with reference to (S340) and (S345) corresponding to FIG. 3, main section 420 may display the inputs that were previously generated on online service server 110 but that were not accessed, read or viewed by a user. These inputs may be arranged in main section 420 in reverse chronological order or arranged by each acknowledged contact, as described above.

For option 3 explained with reference to (S350) and (S355) corresponding to FIG. 3, main section 420 may display randomly selected inputs among inputs that were previously generated on online service server 110. These inputs may be arranged in main section 420 in reverse chronological order or arranged by each acknowledged contact, as described above.

Being described as the reorganized inputs may be arranged in main section 420 in reverse chronological order, or by each acknowledged contact, one of skill in the art may readily understand other arrangements may also be applied as long as they pertain to the concept of the present disclosure.

As shown in FIGS. 4A and 4B, interface 400 may further include an additional section 430. Additional section 430 may include an advertisement section displaying one or more advertisements.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

Figure 5:
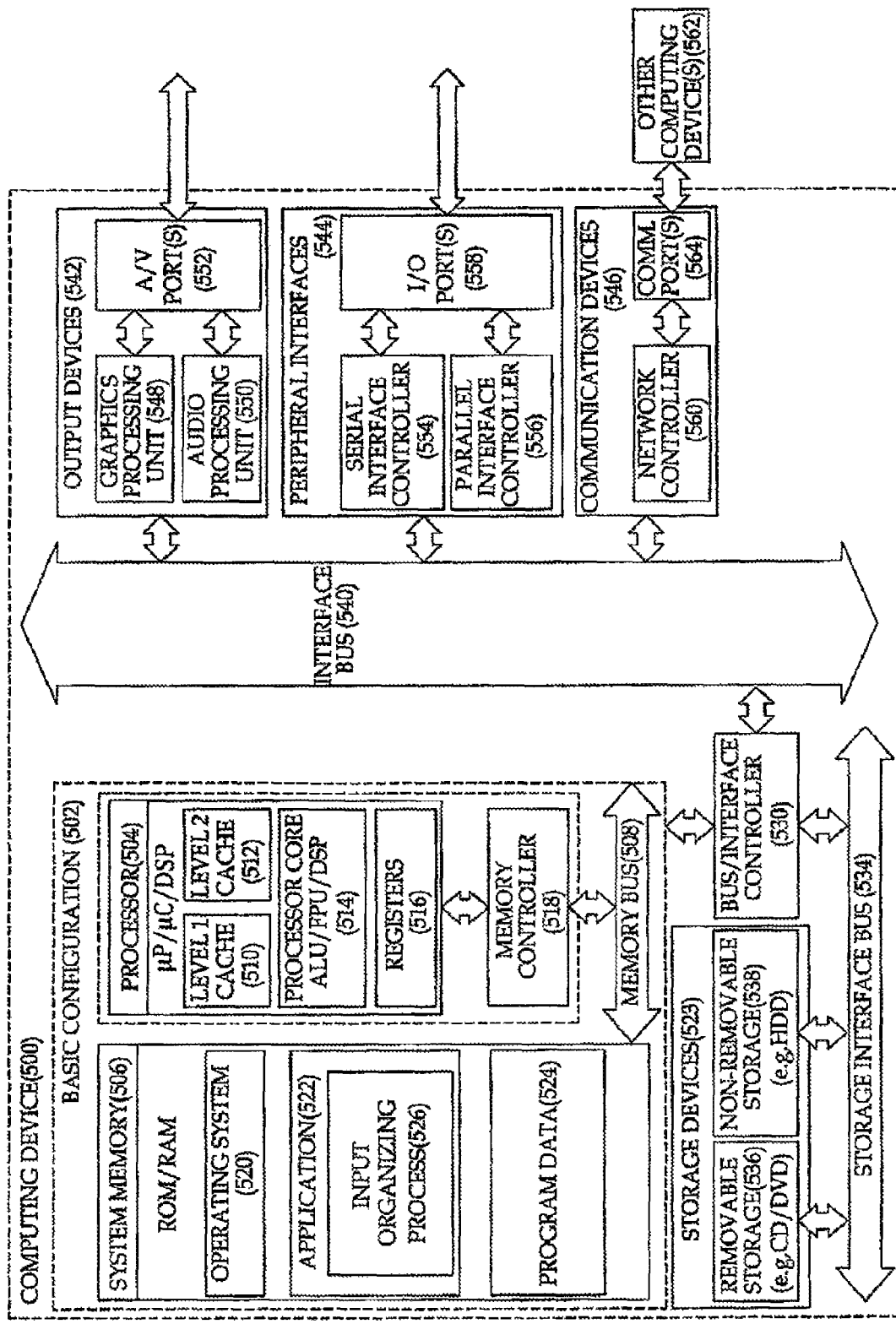
FIG. 5 is a schematic block diagram illustrating an example computing device that is configured in accordance with at least some embodiments described in the present disclosure.

FIG. 5 is a schematic block diagram illustrating an example computing device 500 that is configured to organize inputs for an online service in accordance with some embodiments described in the present disclosure. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor ($\mu P$), a microcontroller ($\mu C$), a digital signal processor (DSP), or any combination thereof. Processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include a input organizing process 526 (e.g., the process for organizing inputs for an online service described above in conjunction with environment 100 for executing an online service of FIG. 1, online service server 110 of FIG. 2 and/or the process for organizing inputs for an online service described above in conjunction with the flow chart of FIG. 3) that is arranged to organize inputs for an online service. Program data 524 may include any data that may be useful for organize inputs for an online service, as is described herein. In some embodiments, application 522 may be arranged to operate with program data 524 on operating system 520 such that the inputs previously generated on the personalized page hosted on the server may be efficiently reorganized in accordance with one of multiple arrangements. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 523 via a storage interface bus 534. Data storage devices 523 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

A storage medium device having computer readable instructions embodied therewith is provided. The computer readable instructions, when executed on computing device 500, cause computing device 500 to perform the method to organize inputs for an online service, as is described herein.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

The present disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which may, of course, vary. It is also to be understood that the terminology used herein is for the purpose of describing particular embodiments only, and is not intended to be limiting.

The invention claimed is:

1. A method to organize inputs for an online service, the method comprising:
   determining that no updated inputs associated with an acknowledged contact regarding the online service exist on a personalized page hosted on a server corresponding to the online service for a predetermined time period, wherein updating is at least one of generating inputs or changing inputs previously generated on the personalized page hosted on the server;
   identifying at least one input associated with the acknowledged contact existing continuously on the personalized page from before the beginning of the predetermined time period until after the end of the predetermined time period and not user-accessed during at least part of a time of user access to the server corresponding to the online service during the predetermined time period;
   responsive to the determining that no updated inputs associated with the acknowledged contact exist on the personalized page, reorganizing inputs existing on the personalized page hosted on the server, wherein the reorganized inputs include the identified at least one input associated with the acknowledged contact; and
   indicating the identified at least one input associated with the acknowledged contact as the most readily accessible input among the reorganized inputs on the personalized page hosted on the server;

wherein the identified at least one input was generated on the personalized page hosted on the server before the contact was acknowledged.

2. The method of claim 1, wherein the inputs and the identified at least one input comprise at least one of an image, a video, a voice, a text, a message, a profile change, a status change, an indication of activity, and adding a rating.

3. The method of claim 1, wherein the predetermined time period is determined based on a policy of the online service or a frequency of access.

4. The method of claim 1, wherein the online service comprises a social network service, and the acknowledged contact comprises a friend.

5. An apparatus to organize inputs for an online service, the apparatus comprising:
   a processor configured to:
      determine that no updated inputs associated with an acknowledged contact regarding the online service exist on a personalized page hosted on a server corresponding to the online service for a predetermined time period, wherein updating is at least one of generating inputs or changing inputs previously generated on the personalized page hosted on the server;
      identify at least one input associated with the acknowledged contact existing continuously on the personalized page from before the beginning of the predetermined time period until after the end of the predetermined time period and not user-accessed during at least part of a time of user access to the server corresponding to the online service during the predetermined time period;
      responsive to determining that no updated inputs associated with the acknowledged contact exist on the personalized page, reorganize inputs existing on the personalized page hosted on the server, wherein the reorganized inputs include the identified at least one input associated with the acknowledged contact; and
      indicate the identified at least one input associated with the acknowledged contact as the most readily accessible input among the reorganized inputs on the personalized page hosted on the server;
      wherein the identified at least one input was generated on the personalized page hosted on the server before the contact was acknowledged.

6. The apparatus of claim 5, wherein the inputs and the identified at least one input comprise at least one of an image, a video, a voice, a text, a message, a profile change, a status change, an indication of activity, and adding a rating.

7. The apparatus of claim 5, wherein the predetermined time period is determined based on a policy of the online service or a frequency of access.

8. The apparatus of claim 5, wherein the online service comprises a social network service, and the acknowledged contact comprises a friend.

9. A non-transitory computer-readable medium having stored thereon a plurality of computer-executable instructions that, when executed by a computing device, cause the computing device to perform operations comprising:
   determining that no updated inputs associated with an acknowledged contact regarding the online service exist on a personalized page hosted on a server corresponding to an online service for a predetermined time period, wherein updating is at least one of generating inputs or changing inputs previously generated on the personalized page hosted on the server;
   identifying at least one input associated with the acknowledged contact existing continuously on the personalized page from before the beginning of the predetermined time period until after the end of the predetermined time period and not user-accessed during at least part of a time of user access to the server corresponding to the online service during the predetermined time period;
   responsive to the determining that no updated inputs associated with the acknowledged contact exist on the personalized page, reorganizing inputs existing on the personalized page hosted on the server for the online service, wherein the reorganized inputs include the identified at least one input associated with the acknowledged contact; and
   indicating the identified at least one input associated with the acknowledged contact as the most readily accessible input among the reorganized inputs on the personalized page hosted on the server;
   wherein the identified at least one input was generated on the personalized page hosted on the server before the contact was acknowledged.

10. The non-transitory computer-readable medium of claim 9, wherein the predetermined time period is determined based on a policy of the online service or a frequency of access.

11. The non-transitory computer-readable medium of claim 9, wherein the online service comprises a social network service, and the acknowledged contact comprises a friend.

* * * * *